(12) United States Patent
Lee et al.

(10) Patent No.: US 7,102,690 B2
(45) Date of Patent: Sep. 5, 2006

(54) CLOCK SIGNAL SYNTHESIZER WITH MULTIPLE FREQUENCY OUTPUTS AND METHOD FOR SYNTHESIZING CLOCK SIGNAL

(75) Inventors: Chuan-Chen Lee, Hsinchu (TW); Chia-Liang Tai, Taipei (TW); Yi-Chieh Huang, Hsinchu (TW)

(73) Assignee: Via Technologies Inc., Shindian City (TW)

( * ) Notice: Subject to any disclaimer, the term of this patent is extended or adjusted under 35 U.S.C. 154(b) by 538 days.

(21) Appl. No.: 10/231,847

(22) Filed: Aug. 30, 2002

(65) Prior Publication Data
US 2003/0174245 A1 Sep. 18, 2003

(30) Foreign Application Priority Data
Mar. 12, 2002 (TW) .............................. 91104623 A

(51) Int. Cl.
*H04N 7/01* (2006.01)
(52) U.S. Cl. ...................................................... 348/542
(58) Field of Classification Search ................ 348/542, 348/544, 550, 446, 441, 537; 375/373
See application file for complete search history.

(56) References Cited

U.S. PATENT DOCUMENTS

| | | | |
|---|---|---|---|
| 4,947,251 A | 8/1990 | Hentschel | |
| 5,146,329 A | 9/1992 | Flamm | |
| 5,247,354 A | 9/1993 | Nakajima | |
| 5,270,714 A * | 12/1993 | Tanaka et al. | 341/59 |
| 5,510,843 A | 4/1996 | Keene et al. | |
| 5,526,051 A | 6/1996 | Gove et al. | |
| 5,608,468 A | 3/1997 | Gove et al. | |
| 5,627,555 A | 5/1997 | den Hollander | |
| 5,633,687 A | 5/1997 | Bhayani et al. | |
| 5,657,089 A * | 8/1997 | Onagawa | 348/537 |
| 5,781,241 A | 7/1998 | Donovan | |
| 5,822,008 A | 10/1998 | Inoue et al. | |
| 5,856,963 A * | 1/1999 | Inagawa et al. | 369/47.3 |
| 5,892,551 A | 4/1999 | Uematsu | |
| 5,894,330 A | 4/1999 | Huang et al. | |
| 5,910,820 A | 6/1999 | Herz et al. | |
| 5,912,710 A | 6/1999 | Fujimoto | |
| 5,912,711 A * | 6/1999 | Lin et al. | 348/446 |
| 5,912,714 A * | 6/1999 | Kawamura | 348/555 |
| 5,914,753 A | 6/1999 | Donovan | |

(Continued)

FOREIGN PATENT DOCUMENTS

JP 07-059052 3/1995

*Primary Examiner*—Paulos M. Natnael
(74) *Attorney, Agent, or Firm*—Volpe and Koenig, P.C.

(57) ABSTRACT

A method for synthesizing a clock signal with multiple frequency outputs for use in a converter for converting a non-interlacing scan data into an interlacing scan data is disclosed. The converter provides a first reference clock signal with a frequency F1. The method includes the steps of receiving the first reference clock signal with the frequency F1 to generate and output a clock signal with a frequency F1×N, proceeding a divided-by-P1 and a divided-by-P2 operations on the clock signal with a frequency F1×N, respectively, to output a first output clock signal with a frequency F1×N/P1 and a second output clock signal with a frequency F1×N/P2, respectively. The value P2/P1 correlates to a ratio of the pixel number of a horizontal scan line in the non-interlacing scan data to that in the interlacing scan data. In addition, a clock signal synthesizer with multiple frequency outputs is also disclosed.

7 Claims, 3 Drawing Sheets

U.S. PATENT DOCUMENTS

| | | |
|---|---|---|
| 5,936,968 A * | 8/1999 | Lyons ........................ 370/503 |
| 5,963,261 A | 10/1999 | Dean |
| 6,028,641 A * | 2/2000 | Kim ........................... 348/537 |
| 6,069,666 A * | 5/2000 | Lyons ........................ 348/512 |
| 6,084,568 A | 7/2000 | Premi et al. |
| 6,094,226 A | 7/2000 | Ke et al. |
| 6,108,041 A | 8/2000 | Faroudja et al. |
| 6,118,488 A | 9/2000 | Huang |
| 6,275,234 B1 | 8/2001 | Iwaki |
| 6,281,933 B1 | 8/2001 | Ritter |
| 6,285,402 B1 | 9/2001 | Miyazaki et al. |
| 6,307,896 B1 * | 10/2001 | Gumm et al. ............... 375/316 |
| 6,346,970 B1 | 2/2002 | Boehlke |
| 6,359,653 B1 | 3/2002 | Huang |
| 6,441,857 B1 | 8/2002 | Wicker et al. |
| 6,563,544 B1 | 5/2003 | Vasquez |
| 6,597,402 B1 | 7/2003 | Butler et al. |
| 6,704,056 B1 * | 3/2004 | Kitahara et al. ............ 348/458 |
| 6,795,043 B1 * | 9/2004 | Shibata ........................ 345/13 |
| 6,801,591 B1 * | 10/2004 | Frencken .................... 375/373 |
| 6,898,327 B1 | 5/2005 | Hrusecky et al. |
| 2002/0113891 A1 | 8/2002 | Felts |
| 2003/0007686 A1 | 1/2003 | Roever |
| 2003/0067552 A1 | 4/2003 | Leyvi et al. |
| 2003/0095205 A1 | 5/2003 | Orlick et al. |
| 2003/0098925 A1 | 5/2003 | Orlick |

* cited by examiner

CLOCK SIGNAL SYNTHESIZER WITH MULTIPLE FREQUENCY OUTPUTS AND METHOD FOR SYNTHESIZING CLOCK SIGNAL

FIELD OF THE INVENTION

The present invention relates to a clock signal synthesizer with multiple frequency outputs, and more particularly to a clock signal synthesizer with multiple frequency outputs for use in a TV encoder. The present invention also relates to a method for synthesizing a clock signal for use in a TV encoder.

BACKGROUND OF THE INVENTION

Nowadays, many electrical appliances are widely used with computers due to the amazing power of computers. For example, video compact disks (VCDs) and digital versatile disks (DVDs) are able to be played by a personal computer. Since the size of a typical computer monitor is not large enough to exhibit the spectacular video effect of the VCD or DVD disks, it is preferred that the signals be outputted from the personal computer to a TV set to be displayed on the relatively large TV screen. The purpose can be achieved by employing a display adapter.

FIG. 1A is a partial functional block diagram of a typical display adapter. The pixel parallel digital signals from a graphic chip 10 are selectively converted into a proper format of analog signals via either a random access memory digital-to-analog converter (RAM DAC) 11 or a TV encoder 12, and delivered to a computer monitor 13 or a TV screen 14, respectively, for display. Further, for TV analog signals, two formats, i.e. the NTSC (National Television Standards Committee) standard and the PAL (Phase Alternate Line) standard, are involved.

The partial functional block diagram of the TV encoder 12 can be seen in FIG. 1B. The pixel parallel digital signals from the graphic chip 10 are processed by a data capture device 121, a color space converter 122, a scaler and deflicker 123, a first-in first-out buffer 124, an NTSC/PAL encoder 125 and a digital-to-analog converter 126 to produce the TV analog signals either in the NTSC or PAL standard.

The scaler and deflicker 123 is used for processing a non-interlacing scan data and then outputting the processed non-interlacing scan data to the first-in first-out buffer 124. The NTSC/PAL encoder 125 accesses the data from the first-in first-out buffer 124 to separate it into an odd field and an even field, resulting in that an interlacing scan data is displayed on the TV screen. The time for processing two horizontal scan lines by the scaler and deflicker 123 is equal to that for processing one horizontal scan line by the NTSC/PAL encoder 125. Thus, the relationship between the frequency Fsd of the clock signal required for the scaler and deflicker 123 and the frequency Fe of the clock signal required for the NTSC/PAL encoder 125 can be represented by the following equation (1):

$$Fsd/Fe = 2 \times H\_sd/H\_e \qquad (1),$$

wherein H_sd represents the number of pixels in a horizontal scan line processed by the scaler and deflicker 123, while H_e represents the number of pixels in a horizontal scan line processed by the NTSC/PAL TV encoder 125.

Conventionally, the TV encoder 12 uses a single phase-locked loop (PLL) clock signal generator 127 to generate a clock signal simultaneously provided to the scaler and deflicker 123 and the NTSC/PAL TV encoder 125. In other words, Fsd=Fe. When larger and larger pixel number, e.g. 1024 points, 1152 points, 1365 points or even 1600 points, for each horizontal scan line in the non-interlacing image data needs to be processed by the scaler and deflicker 123, the processed image width displayed on the TV frame becomes narrower than expected. It is because the frequency Fsd is increased with the pixel number in a scan line. In the case that Fe equals to Fsd, the frequency Fe increases accordingly. The increasing frequency Fe will speed up the output frequency of individual pixel in the scan line and thus shorten the distance between every two adjacent pixels on the TV screen. In other words, a seemingly compressed image is shown. Thus, the original width of the TV screen is not efficiently used.

Therefore, the purpose of the present invention is to develop a clock signal synthesizer with multiple frequency outputs and a method for synthesizing a clock signal for use with a TV encoder to deal with the above situations encountered in the prior art.

SUMMARY OF THE INVENTION

An object of the present invention is to provide a clock signal synthesizer with different frequency outputs for the scaler and deflicker and the NTSC/PAL TV encoder, respectively.

According to an aspect of the present invention, there is provided a clock signal synthesizer with multiple frequency outputs for use in a converter for converting a non-interlacing scan data into an interlacing scan data. The converter provides a first reference clock signal with a frequency F1. The clock signal synthesizer includes a phase-locked loop (PLL) oscillator generating a clock signal with a frequency F1×N in response to the first reference clock signal, and outputting the clock signal with the frequency F1×N, a divider feedback circuit electrically connected to the input end of the PLL oscillator for receiving and proceeding a divided-by-N operation on the clock signal with the frequency F1×N, and feeding a feedback clock signal with a frequency F1 back to the PLL oscillator, a first divider output circuit electrically connected to the PLL oscillator for receiving and proceeding a divided-by-P1 operation on the clock signal with the frequency F1×N, and outputting a first output clock signal with a frequency F1×N/P1, and a second divider output circuit electrically connected the PLL oscillator for receiving and proceeding a divided-by-P2 operation on the clock signal with the frequency F1×N, and outputting a second output clock signal with a frequency F1×N/P2. The value P2/P1 correlates to a ratio of the pixel number of a horizontal scan line in the non-interlacing scan data to the pixel number of a horizontal scan line in the interlacing scan data.

Preferably, the first reference clock signal with the frequency F1 is outputted by a pre-divider circuit, which proceeds a divided-by-D operation on an original reference clock signal with a frequency D×F1 to output the first reference clock signal with the frequency F1.

In an embodiment, the converter is disposed in a display adapter of a TV encoder. Preferably, the first output clock signal with the frequency F1×N/P1 and the second output clock signal with the frequency F1×N/P2 are provided to a scaler/a deflicker and a NTSC/PAL encoder of the TV encoder, respectively.

For example, the first and second divider output circuits can be a divided-by-P1 and a divided-by-P2 counters, respectively.

According to another aspect of the present invention, there is provided a method for synthesizing a clock signal with multiple frequency outputs for use in a converter for converting a non-interlacing scan data into an interlacing scan data. The converter provides a first reference clock signal with a frequency F1. The method includes the steps of receiving the first reference clock signal with the frequency F1 to generate and output a clock signal with a frequency F1×N, proceeding a divided-by-P1 operation on the clock signal with a frequency F1×N to output a first output clock signal with a frequency F1×N/P1, and proceeding a divided-by-P2 operation on the clock signal with a frequency F1×N to output a second output clock signal with a frequency F1×N/P2. The value P2/P1 correlates to a ratio of the pixel number of a horizontal scan line in the non-interlacing scan data to the pixel number of a horizontal scan line in the interlacing scan data.

Preferably, the first reference clock signal with the frequency F1 is obtained by proceeding a divided-by-D operation on an original reference clock signal with a frequency D×F1.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2:
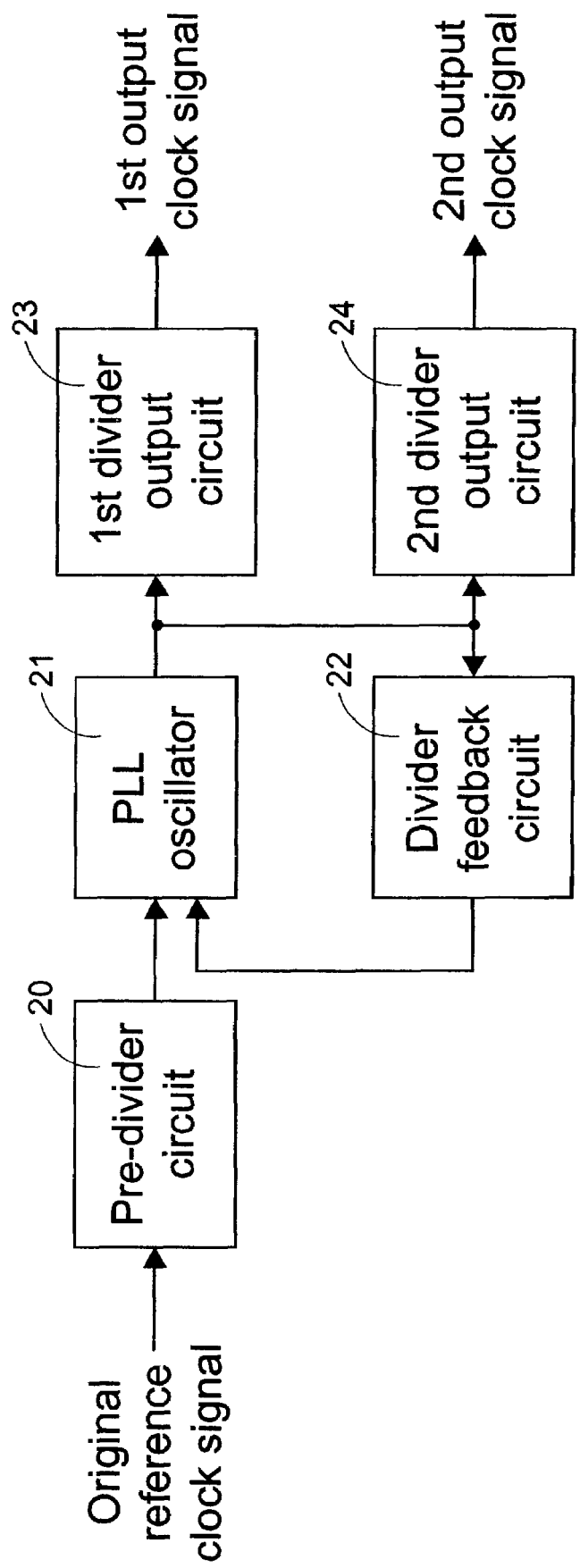
FIG. 2 is a schematic functional block diagram illustrating a preferred embodiment of a clock signal synthesizer with multiple frequency outputs according to the present invention.

Please refer to FIG. 2 which is schematic functional block diagram illustrating a preferred embodiment of a clock signal synthesizer with multiple frequency outputs according to the present invention. The clock signal synthesizer includes a pre-divider circuit 20, a phase-locked loop (PLL) oscillator 21, a divider feedback circuit 22, a first divider output circuit 23 and a second divider output circuit 24.

After an original reference clock signal with the frequency D×F1 enters the pre-divider circuit 20 to proceed a divided-by-D operation, a reference clock signal with the frequency F1 is outputted by the pre-divider circuit 20 to the PLL oscillator 21. Subsequently, the PLL oscillator 21 generates a clock signal with the frequency F1×N in response to the reference clock signal with the frequency F1 and outputs to the divider feedback circuit 22. The clock signal with the frequency F1×N is transmitted to the first divider output circuit 23 and the second divider output circuit 24 electrically connected to the PLL oscillator 21 to be processed, respectively. In addition, the clock signal with the frequency F1×N is fed back to the PLL oscillator 21 following a divided-by-N operation of the divider feedback circuit 22 for the reference of the PLL oscillator 21. In this embodiment, the first divider output circuit 23 and the second divider output circuit 24 are implemented by a divided-by-P1 counter and a divided-by-P2 counter, respectively. Thus, after receiving the clock signal with the frequency F1×N, the first and second divider output circuits 23 and 24 proceed a divided-by-P1 operation and a divided-by-P2 operation, respectively, to output an first output clock signal with the frequency F1×N/P1 and a second output clock signal with the frequency F1×N/P2, respectively.

Figure 1A:
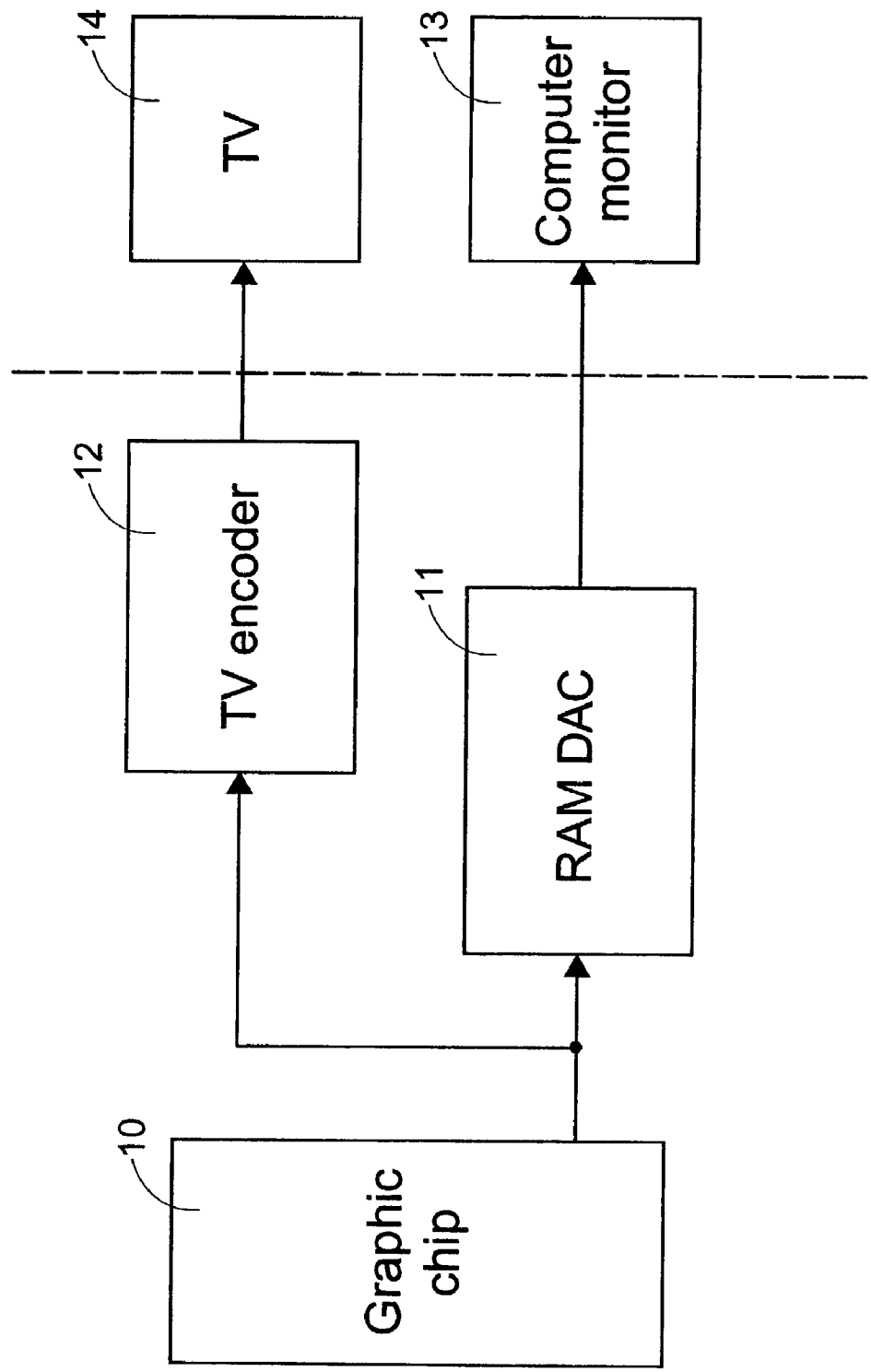
FIG. 1A is a partial functional block diagram illustrating a typical display adapter.
Figure 1B:
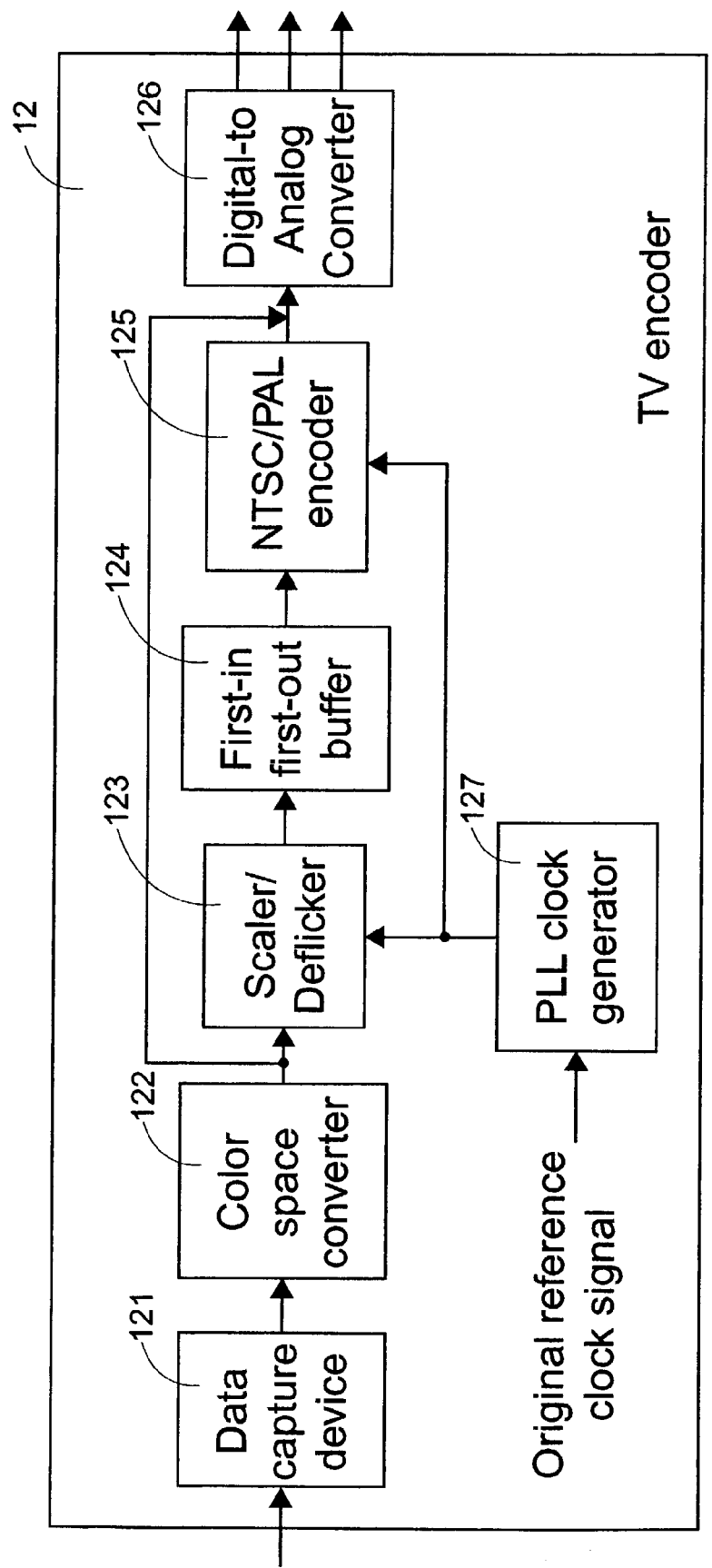
FIG. 1B is a partial functional block diagram illustrating a conventional TV encoder.

The first output clock signal with the frequency F1×N/P1 and the second output clock signal with the frequency F1×N/P2 are provided to the scaler/the deflicker 123 and the NTSC/PAL encoder 125 of the TV encoder 12 in FIG. 1B, respectively. In other words, the frequency Fsd of the clock signal provided for the scaler and deflicker 123 equals to F1×N/P1, and the frequency Fe of the clock signal provided for the NTSC/PAL encoder 125 equals to F1×N/P2. Hence, according to the equation (1), the following equation (2) is obtained:

$$Fsd/Fe = P2/P1 = 2 \times H\_sd/H\_e \quad (2),$$

wherein H_sd represents the number of pixels in a horizontal scan line processed by the scaler and deflicker 123, and H_e represents the number of pixels in a horizontal scan line processed by the NTSC/PAL TV encoder 125. The ratio of Fsd to Fe may vary by adjusting the value P2/P1. Thus, in order to obtain optimal frame effect, the value P2/P1 is properly tuned in response to the variation of the ratio of the pixel number of a horizontal scan line in the non-interlacing scan data to that in the interlacing scan data. For example, when P1 is adjusted to be smaller than P2, the frequency Fe is smaller than the frequency Fsd. Since the smaller frequency Fe will slow down the output frequency of individual pixel in the scan line, the distance between every two adjacent pixels on the TV screen is enlarged. By finding an optimal value of P2/P1, the width of the image shown on the TV screen can conform to the original width of the TV screen.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A clock signal synthesizer with multiple frequency outputs for use in a converter for converting a non-interlacing scan data into an interlacing scan data, said converter providing a first reference clock signal with a frequency F1, said clock signal synthesizer comprising:

a phase-locked loop (PLL) oscillator generating a clock signal with a frequency F1×N in response to said first reference clock signal received by an input end thereof, and outputting said clock signal with said frequency F1×N from an output end thereof;

a divider feedback circuit electrically connected to said input end of said PLL oscillator for receiving and proceeding a divided-by-N operation on said clock signal with said frequency F1×N, and feeding a feedback clock signal with a frequency F1 back to said PLL oscillator;

a first divider output circuit electrically connected to said PLL oscillator for receiving and proceeding a divided-by-P1 operation on said clock signal with said frequency F1×N, and outputting a first output clock signal with a frequency F1×N/P1; and a second divider output circuit electrically connected to said PLL oscillator for receiving and proceeding a divided-by-P2 operation on said clock signal with said frequency F1×N, and outputting a second output clock signal with a frequency F1×N/P2, wherein a value P2/P1 correlates to a ratio of the pixel number of a horizontal scan line in said non-interlacing scan data to the pixel number of a horizontal scan line in said interlacing scan data.

2. The clock signal synthesizer according to claim 1 wherein said first reference clock signal with said frequency F1 is outputted by a pre-divider circuit, which proceeds a divided-by-D operation on an original reference clock signal with a frequency D×F1 to output said first reference clock signal with said frequency F1.

3. The clock signal synthesizer according to claim 1 wherein said converter is disposed in a display adapter of a TV encoder.

4. The clock signal synthesizer according to claim 3 wherein said first output clock signal with said frequency F1×N/P1 and said second output clock signal with said frequency F1×N/P2 are provided to a scaler /a deflicker and a NTSC/PAL encoder of said TV encoder, respectively.

5. The clock signal synthesizer according to claim 1 wherein said first and second divider output circuits are a divided-by-P1 and a divided-by-P2 counters, respectively.

6. A method for synthesizing a clock signal with multiple frequency outputs for use in a converter disposed in a display adapter of a TV encoder for converting a non-interlacing scan data into an interlacing scan data, said converter providing a first reference clock signal with a frequency F1, said method comprising the steps of:

receiving said first reference clock signal with said frequency F1 to generate and output a clock signal with a frequency F1×N;

proceeding a divided-by-P1 operation on said clock signal with a frequency F1×N to output a first output clock signal with a frequency F1×N/P1;

proceeding a divided-by-P2 operation on said clock signal with a frequency F1×N to output a second output clock signal with a frequency F1×N/P2, wherein a value P2/P1 correlates to a ratio of the pixel number of a horizontal scan line in said non-interlacing scan data to the pixel number of a horizontal scan line in said interlacing scan data; and providing said first output clock signal with said frequency F1×N/P1 and said second output clock signal with said frequency F1×N/P2 to a scaler/a deflicker and a NTSC/PAL encoder of said TV encoder, respectively.

7. The method according to claim 6 wherein said first reference clock signal with said frequency F1 is obtained by proceeding a divided-by-D operation on an original reference clock signal with a frequency D×F1.

* * * * *